(12) United States Patent
Vine et al.

(10) Patent No.: US 9,481,479 B2
(45) Date of Patent: Nov. 1, 2016

(54) CONTAINER SEALING APPARATUS

(75) Inventors: Lee Michael Vine, Lytchett Matravers (GB); Graham Andrew Charles Neale, Bournemouth (GB)

(73) Assignee: ISHIDA EUROPE LIMITED, West Midlands (GB)

( * ) Notice: Subject to any disclaimer, the term of this patent is extended or adjusted under 35 U.S.C. 154(b) by 522 days.

(21) Appl. No.: 13/983,914

(22) PCT Filed: Feb. 10, 2012

(86) PCT No.: PCT/GB2012/050302
§ 371 (c)(1),
(2), (4) Date: Aug. 8, 2013

(87) PCT Pub. No.: WO2012/107779
PCT Pub. Date: Aug. 16, 2012

(65) Prior Publication Data
US 2014/0007545 A1 Jan. 9, 2014

(30) Foreign Application Priority Data
Feb. 11, 2011 (GB) .................... 1102457.7

(51) Int. Cl.
*B65B 7/16* (2006.01)
*B65B 61/06* (2006.01)
(Continued)

(52) U.S. Cl.
CPC .............. *B65B 7/16* (2013.01); *B65B 7/164* (2013.01); *B65B 61/065* (2013.01); *B29C 65/18* (2013.01);
(Continued)

(58) Field of Classification Search
CPC ........... B65B 7/164; B65B 7/16; B65B 7/26; B65B 7/2878; B65B 43/46; B65B 31/028; B65B 31/06; B65B 59/04; B65B 65/006; B65B 65/003; B65B 2210/02; B65B 61/065; B29C 65/18; B29C 65/7861; B29C 65/7802; B29C 65/787; B29C 66/1312; B29C 66/8322; B29C 66/849; B29C 66/53461; B29C 66/8432; B29C 66/112; B29C 66/53462; B65G 47/902; B65G 47/31; B65G 2201/0235
USPC .............. 53/329.2, 329.3, 329.4, 329.5, 367, 53/368, 282, 202; 198/836.1, 836.2, 198/836.3; 156/69, 292, 538, 539, 583.1
See application file for complete search history.

(56) References Cited

U.S. PATENT DOCUMENTS 2,765,783 A * 10/1956 Randol .................. F01L 1/245
123/90.34
3,621,973 A 11/1971 Carlson et al.
(Continued)

FOREIGN PATENT DOCUMENTS

EP 1574431 A1 9/2005
EP 2179927 A2 4/2010
(Continued)

*Primary Examiner* — Thanh Truong
*Assistant Examiner* — Thomas Wittenschlaeger
(74) *Attorney, Agent, or Firm* — Singularity LLP

(57) ABSTRACT

A container sealing apparatus is provided, comprising a sealing tool having a lower tool half and an upper tool half; a feed lane for transferring one or more containers to and away from means for transferring containers on to the lower tool half of the sealing tool; and a lifting mechanism for moving the lower tool half towards the upper tool half. The container sealing apparatus also comprises an elongate container guide extending along the feed lane and sealing tool to laterally locate containers as they are transported along the teed lane and sealing tool, and control apparatus adapted to adjust the lateral position of at least the part of said container guide extending along said feed lane.

13 Claims, 7 Drawing Sheets

(51) Int. Cl.
   *B29C 65/18* (2006.01)
   *B29C 65/78* (2006.01)
   *B29C 65/00* (2006.01)

(52) U.S. Cl.
   CPC .......... *B29C 65/7802* (2013.01); *B29C 65/787* (2013.01); *B29C 65/7861* (2013.01); *B29C 66/112* (2013.01); *B29C 66/1312* (2013.01); *B29C 66/53461* (2013.01); *B29C 66/8322* (2013.01); *B29C 66/849* (2013.01); *B29C 66/8432* (2013.01)

(56) References Cited

U.S. PATENT DOCUMENTS

| | | | | |
|---|---|---|---|---|
| 5,527,103 A * | 6/1996 | Pittman | ................ | A01K 63/006 217/12 R |
| 6,460,692 B2 * | 10/2002 | Dionne | ............ | H01L 21/67706 198/836.3 |
| 6,588,578 B1 * | 7/2003 | Ernst | .................. | B65G 21/2072 198/502.1 |
| 2004/0098947 A1 * | 5/2004 | Konishi | .................. | B65B 7/164 53/329.5 |
| 2008/0245031 A1 * | 10/2008 | Salvoni | .................. | B65G 47/31 53/299 |
| 2009/0193766 A1 * | 8/2009 | Dyke | ........................ | B65B 7/26 53/476 |
| 2009/0301658 A1 * | 12/2009 | Vine | ........................ | B65B 7/164 156/497 |
| 2011/0072764 A1 * | 3/2011 | Daniek | ................ | B26D 7/2614 53/556 |

FOREIGN PATENT DOCUMENTS

| | | |
|---|---|---|
| EP | 2275351 A1 | 1/2011 |
| WO | 2006041298 A2 | 4/2006 |

* cited by examiner

CONTAINER SEALING APPARATUS

This invention relates to a container sealing apparatus. In this context, the term "container" includes any container having an upwardly facing opening to which a film is to be heat sealed. This commonly includes trays.

It is common in the food industry to package food items in heat sealed trays and this must be done at high speed in view of the high throughput required, particularly for fresh fruit and other fresh food items. In one conventional apparatus, trays are fed along a conveyor, filled with food items and then supplied, typically in groups, to a sealing tool. The sealing tool has a lower tool half on which the tray(s) to be sealed is positioned, and the lower tool half is then raised, by a lifting mechanism, towards an upper tool half with a heat sealable film positioned between them. The upper tool half is conventionally a heated plate. The upper tool half is brought into engagement with the heat sealable film and the edge of the or each tray so as to heat seal the film to the tray(s). The tray(s) is then removed from the lower tool half of the sealing tool.

In order to increase throughput and improve flexibility of packaging, it is known to provide a dual lane container sealing apparatus in which a pair of laterally spaced conveyors are provided, each with a sealing tool, so as to effectively define two tray sealing lanes. A centre divider is provided between the two lanes in order to keep the trays apart. Conventionally, the sealing tools are operated in synchrony and a single lifting mechanism is provided for both sealing tools, with the centre divider maintained in a fixed position.

When trays of different sizes (widths) are to be packaged, as the divider is in a fixed position, the position of the trays on the sealing tool varies. The sealing tool is designed to accommodate for this.

A problem arises when sealing tools with independent lift mechanisms are used in a dual lane container sealing apparatus. In this situation, varying the position of the trays on the lower tool half unnecessarily provides excess stresses on the single independent lifting mechanisms.

In accordance with a first aspect of the present invention, there is provided a container sealing apparatus comprising a sealing tool having a lower tool half and an upper tool half; a feed lane for transferring one or more containers to and away from means for transferring containers on to the lower tool half of the sealing tool; a lifting mechanism for moving the lower tool half towards the upper tool half; an elongate container guide extending along the feed lane and sealing tool to laterally locate containers as they are transported along the feed lane and sealing tool, and; control apparatus adapted to adjust the lateral position of at least the part of said container guide extending along said feed lane.

The invention thus provides an adjustable container guide that compensates for different sizes of container while maintaining a consistent path through the packaging machine and allowing for easy removal of the sealing tool. Advantageously, the adjustable guide can be used to keep different sized trays on a fixed "centreline" on the lower tool half of the sealing tool, thus keeping the sealing forces in line with the lift mechanism. The lateral position of the containers on the lower tool half can be chosen so as to reduce the stresses on the lifting mechanism.

In many applications, the containers are trays to be filled with food products.

In a first example the elongate container guide extends along the feed lane and sealing tool, and said control apparatus may be adapted to adjust said container guide such that said container guide is laterally spaced from said lower tool half when said lower tool half is moved towards said upper tool half.

This advantageously provides an uninterrupted guide surface along the feed lane and the sealing tool, allowing for assured guidance of containers along the feed lane and very easy adjustability, for example changing the tool halves. This also simplifies the design, reducing complexity and cost.

In a second example, a part of the container guide extending along the feed lane and a part of the container guide extending along the sealing tool may be independently adjustable. In this example, the part of the container guide extending along the feed lane may be laterally adjustable so as to guide the containers along the desired path. The sealing tool may have a fixed, dedicated guide on the lower tool half that remains in position when the lower tool half rises to meet the upper tool half.

In this second example, the part of the container guide extending along the feed lane may be adjustable to be spaced from the lower tool half. In particular it may be adjustable to be longitudinally spaced from the lower tool half. This allows the upper tool half (which is generally larger than the lower tool half) to be lowered for removal without fouling the feed lane container guide. This removal of the upper tool half may, for example, be for maintenance. In contrast to previous fixed container guide systems, this invention has the advantage that the container guide does not have to be manually removed prior to upper tool half removal/maintenance.

In one example, the elongate container guide may comprise at least two separate sections. This allows ease of manufacture and transport of the elongate container guide. This is particularly important considering that container sealing apparatuses are typically large (for example each separate section may be up to 4 m long).

In the case where the elongate container guide comprises at least two separate sections, the sections may be joined using a half-lap joint. This advantageously provides a container guide having a smooth surface even over the join. This is important as a smooth surface prevents containers snagging on the join as they move through the container sealing apparatus, on a conveyor for example.

The elongate container guide may comprise at least one hole. This advantageously reduces the weight of the container guide, thereby reducing the stresses on the mechanism moving the guide, and increasing the speed at which the lateral position may be adjusted. Preferably, the at least one hole is arranged such that when a part of a container is engaged within the at least one hole, a downward force is applied to the container due to the relative motion between the container and the container guide. This advantageously forces the container down onto the feed lane, increasing the contact between the container and the feed lane, and thereby improving control of the container movement.

In one example, the cross section of the at least one hole has a maximum axis and a minimum axis, and the maximum axis is angled in a direction opposite to the direction of motion of the container through the container sealing apparatus. This arrangement of the at least one hole means that the holes are elongate (for example an ellipse) and inclined towards the direction from which the containers are conveyed, advantageously preventing containers being lifted off the feed lane as they move through the container sealing apparatus along the guide. However, other geometries of hole are envisaged, for example circles, or other hole angles.

The control apparatus may preferably comprise a parallelogram mechanism operable to adjust the lateral position of said container guide. However, other types of mechanism are envisaged such as a four bar linkage or a rack and pinion based mechanism.

In a preferred example, the sealing tool is a heat sealing tool and the upper tool half is a heated upper plate. Alternatively, other means of sealing the trays may be used, such as a thermoforming machine.

The means for transferring containers on to the lower tool half of the sealing tool may be a mechanical gripper, wherein said mechanical gripper is operable to handle containers of different dimensions. Other means for transferring containers onto the lower tool half are envisaged however, for example rollers. When the means for transferring containers on to the lower tool half of the sealing tool is a mechanical gripper, the elongate container guide advantageously allows trays of different sizes to be consistently positioned correctly to be transported by the mechanical gripper.

Although the apparatus can be used with a single feed lane, in a second aspect of the present invention, a dual lane container sealing apparatus is provided, said dual lane container sealing apparatus comprising first and second container sealing apparatuses each according to the first aspect of the invention, wherein the first and second container sealing apparatuses are laterally spaced.

A dual lane container sealing apparatus advantageously allows trays of different sizes to be packaged and sealed simultaneously on respective lanes, increasing throughput of such a sealing apparatus. Alternatively of course, both lanes could be used to package containers of the same size, doubling throughput speed. It is envisaged that more than two lanes could be operated simultaneously.

In one example, the lower tool halves of the first and second container sealing apparatuses may be independently operable. Similarly, the lateral positions of the container guides of the first and second container sealing apparatuses may be independently adjustable. This provides flexibility of the dual lane container sealing apparatus. For example, the lower tool halves can be raised and lowered at different times, or one lane may be stopped for maintenance while the other lane remains operable. This maximises throughput and efficiency of such a sealing apparatus.

Advantageously the independent elongate container guides of the first and second container sealing apparatuses can be used to position different sized trays on the centrelines of each lower tool half, such that the sealing forces are in line with the lifting mechanisms. This reduces the stresses placed on the lifting mechanisms.

Alternatively, the elongate container guides of the first and second container sealing apparatuses are not independent and are driven with a single mechanism, thus reducing complexity.

In one example, the upper tool halves of the first and second container sealing apparatuses may be provided by a common upper heated plate.

Embodiments of the present invention will now be described and contrasted with the prior art with reference to the accompanying drawings in which.

In the following description, relative directional terms such as "upper", "lower", "raised" and "lowered" are used for ease of understanding and are not intended to be limiting.

Figure 1:
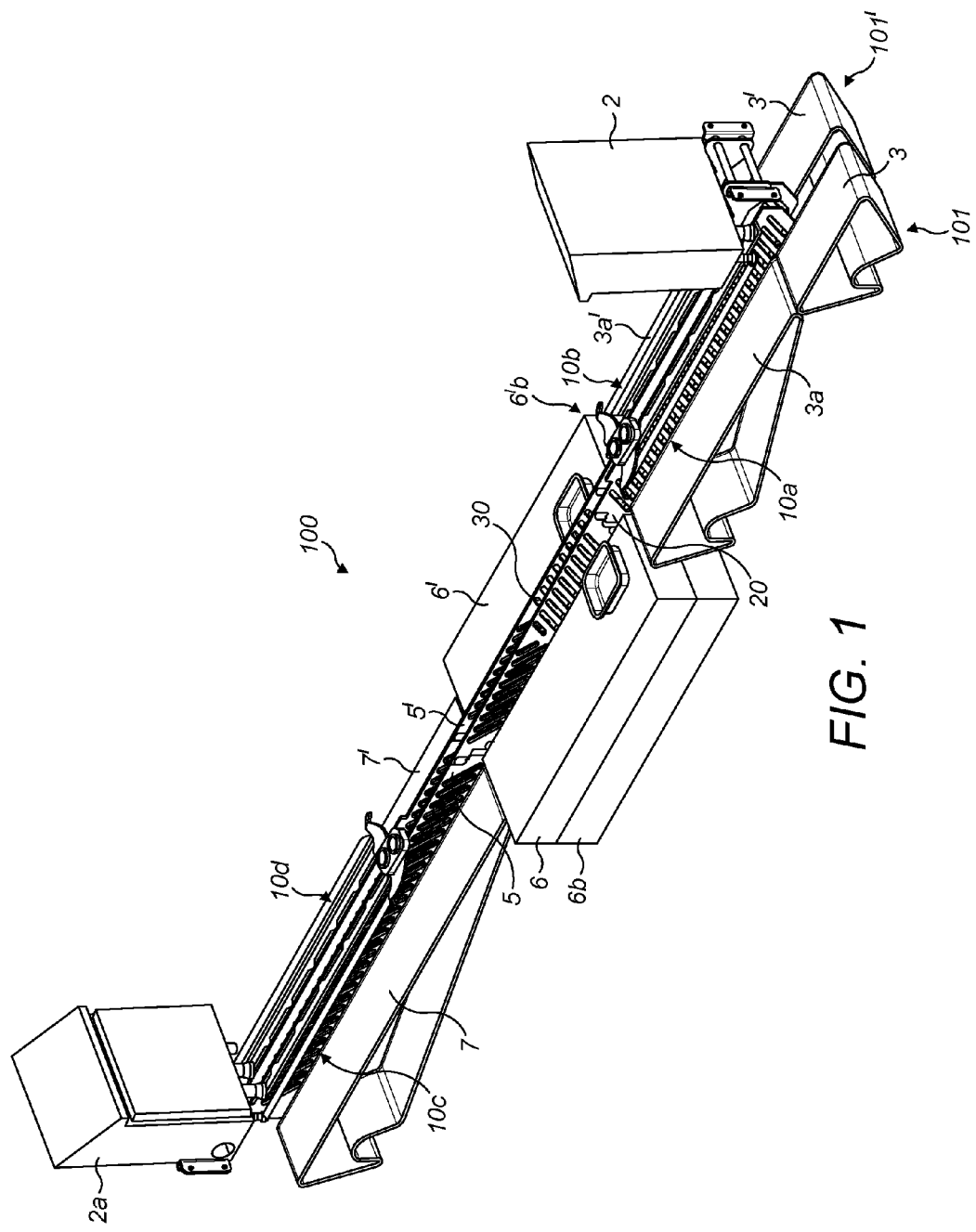
FIG. 1 is a perspective view showing an embodiment of a container sealing apparatus of the present invention in a dual lane food packaging system.

Considering first FIG. 1, a part of a dual lane food packaging system 100 is shown, comprising two food packaging lanes 101, 101' and two adjustable container guides 5, 5'. In this embodiment the containers are trays to be filled with food. Each food packaging lane 101, 101' comprises a first tray feed lane 3, 3'; an intermediate tray feed lane 3a, 3a'; the lower tool half 6, 6' of a sealing tool; and an adjustable tray guide 5, 5'. Each adjustable tray guide extends as a single surface fully along the first tray feed lane 3, 3', the intermediate tray feed lane 3a, 3a', the lower tool half 6, 6' and an output tray feed lane 7, 7'. In the arrangement of FIG. 1, each tray guide 5, 5' comprises three sections joined at joins 20. The joins will be discussed in more detail below with respect to FIGS. 5a and 5b. In alternative embodiments, the tray guide is a unitary member with no joins. The dual lane packaging system further comprises two control apparatuses 2, 2a; one positioned each side of the lower tool half 6, 6'.

The following description will refer to a single food packaging lane 101 for ease of understanding.

Figure 2A:
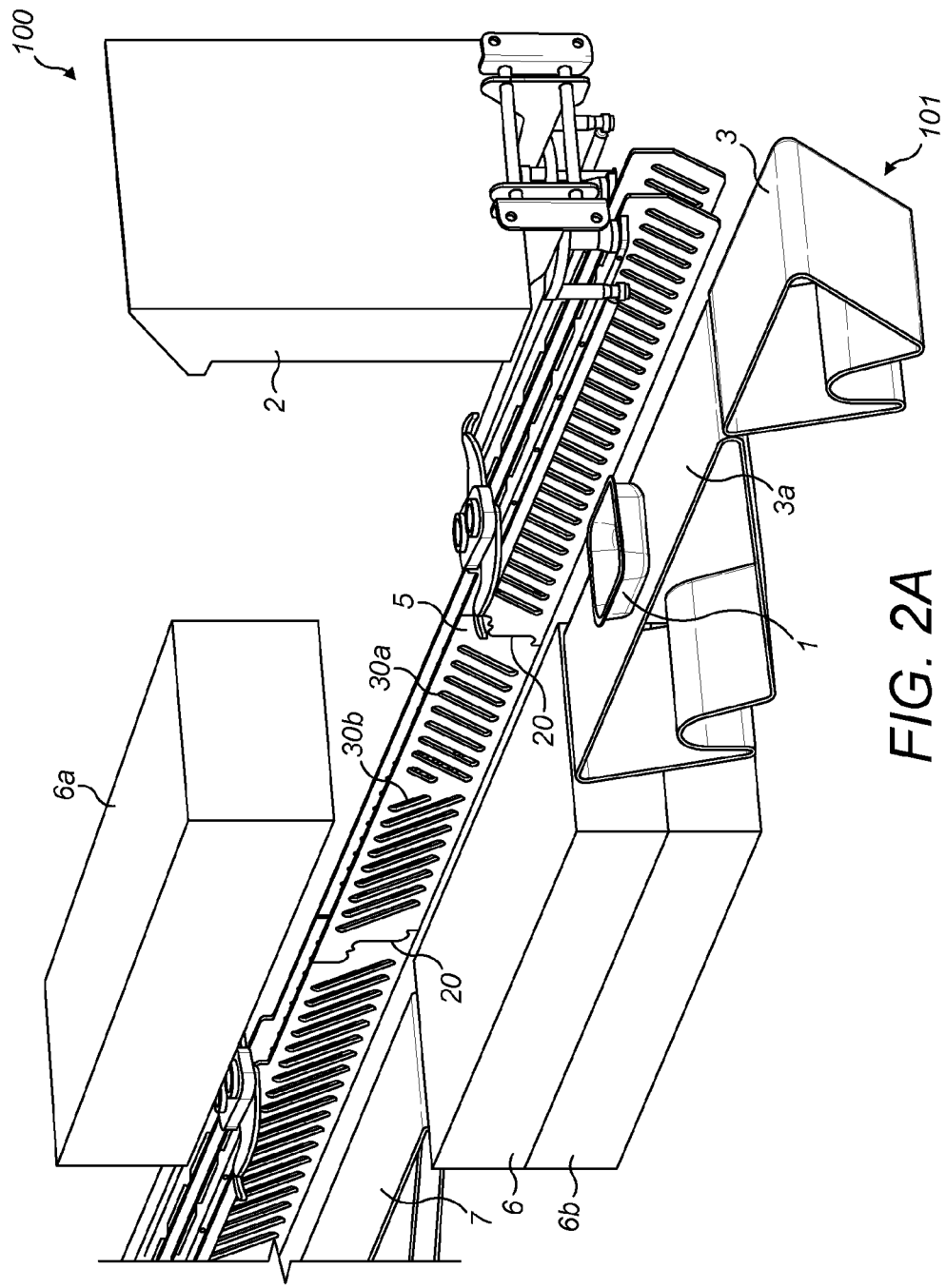
FIG. 2A is a perspective view of part of a food packaging system comprising a sealing tool and an adjustable tray guide according to an embodiment of the invention, wherein the lower tool half of the sealing tool is in a lower position.

Turning now to FIG. 2A, a single food packaging lane 101 is shown. Trays 1 are typically supplied in nests and sit within a tray cassette in a tray de-nester (not shown). In use the trays 1 are extracted from the tray cassette of the tray de-nester and supplied to the first tray feed lane 3 at regular intervals. In this embodiment, the first tray feed lane 3 and the intermediate tray feed lane 3a are conveyers.

The trays 1 deposited by the de-nester are transported on the first tray feed lane 3 towards the lower tool half 6 of the sealing tool. In FIG. 2A the relative position of the upper tool half 6a of the sealing tool is shown. However, it has been omitted from the remainder of the figures for clarity purposes. The trays are filled in a conventional manner with the desired product as they move along first tray feed lane 3, by a filling system (not shown).

Filled trays are transported along the first tray feed lane 3 on to the intermediate tray feed lane 3a. The intermediate tray feed lane 3a comprises indexes (not shown) so as to position the trays 1 at predetermined spacings along the tray feed lane 3a, and the tray feed lane 3a is sized to have a tray capacity equal to the lower tool half 6. After a certain amount of time has passed the intermediate tray feed lane 3a is filled with trays transported from the tray feed lane 3. Once the intermediate tray feed lane 3a is filled, a gripping arm 11 (shown schematically in FIGS. 3A and 3B) lifts the trays from the filled intermediate tray feed lane 3a onto the lower tool half 6. Simultaneously, the gripping arm also transports any sealed trays present on the lower tool half 6 onto the output tray feed lane 7. In this embodiment, the output tray feed lane 7 is also a conveyor, although other methods of transporting the trays along the first, intermediate and output tray feed lanes such as rollers are envisaged.

Once the trays 1 have been placed on the lower tool half 6 the tray sealing process takes place. In this embodiment the lower tool half 6 is lifted towards the upper tool half 6a of the sealing tool during a sealing cycle. In this embodiment the upper tool half is a heated plate. The trays 1 are thereby pushed into contact with a portion of film and the assembly of tray and film is pressed against a corresponding impression on the lower surface of the upper tool half. The impression heats the film around the edge of the tray thereby sealing the film to the tray edge while cutters trim the film around the perimeter. The lower tool half 6, now containing sealed trays, is then lowered back to its original position. While the tray sealing process is being performed, the intermediate tray feed lane 3a is re-filled with fresh trays. Thus, the cycle is completed with the sealed trays being moved by the gripping arm to the output tray feed lane 7 while the fresh unsealed trays 1 are simultaneously transported by the gripping arm from the intermediate tray feed lane 3a to the lower tool half 6.

As seen in FIG. 2A, one side of the tray 1 just touches the tray guide 5 such that the tray follows a path defined by the guide. In most circumstances, the tray will be positioned such that its centreline is in the centre of the first 3 and intermediate 3a tray feed lanes, however it will be appreciated that the tray guide 5 can be positioned such that the tray is in any lateral position on the feed lanes. The desired lateral position of the trays depends on various factors such as the size of the trays and the sealing tool being used. It is particularly advantageous to provide a consistent path through the packaging system for different sizes (widths) of tray. For example, this means that the lateral position of the gripper arms does not have to change for different trays. It is also advantageous to position the centreline of the tray(s) along the centreline of the lower tool half of the sealing tool in order that the sealing forces are in line with the single lane lifting mechanism.

It will also be appreciated that the linear arrangement of the feed lanes and lower tool half depicted in the figures is not limiting, and any arrangement of tray feed lane, with corresponding shaped tray guide 5, may be used.

Figure 3A:
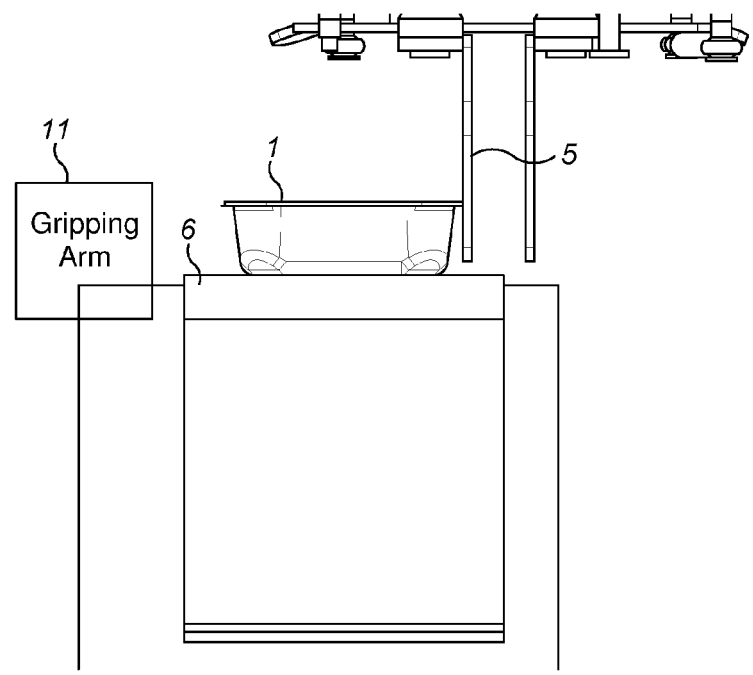
FIG. 3A is a view showing the adjustable tray guide of FIGS. 2A and 2B positioned so as to guide the trays when the lower tool half is in a lower position.
Figure 3B:
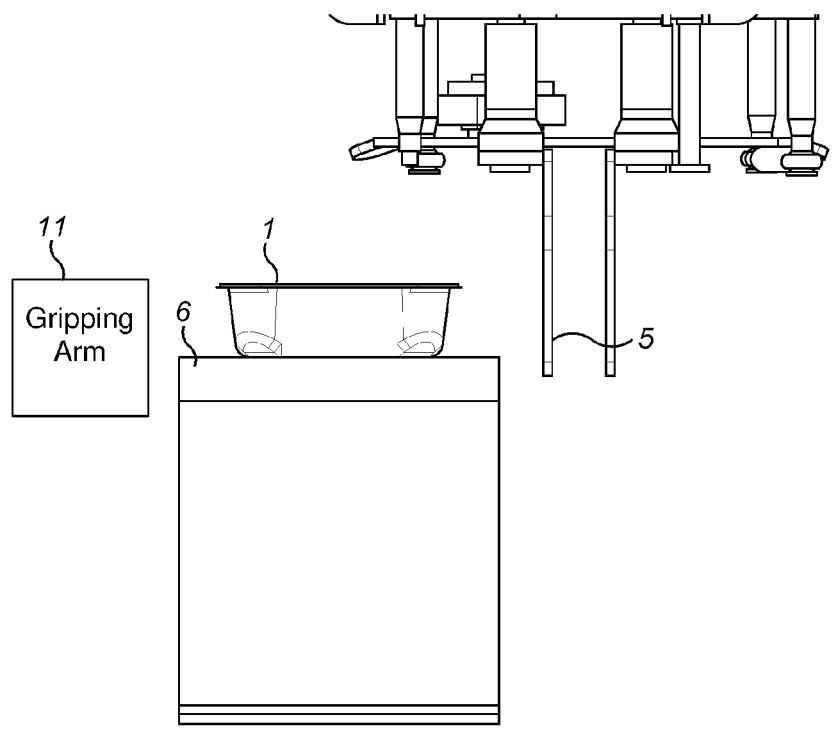
FIG. 3B is a view showing the adjustable tray guide of FIGS. 2A and 2B laterally positioned so as to allow the lower tool half to rise.

As clearly seen in FIG. 3A, the tray guide 5 is vertically separated from the tray feed lane 3 so as to reduce friction as the conveyer moves. It will be appreciated that the tray guide can be vertically positioned at any position such that it will just make contact with a tray 1 moving along the tray feed lane 3.

As seen in FIG. 3A, when the lower tool half 6 is in its lower position (corresponding to FIG. 2A), the tray guide 5 is laterally positioned over the lower tool half 6, meaning that the lower tool half 6 will be fouled if it rises to meet the upper tool half. The control apparatuses 2, 2a synchronise the movement of the gripper arm and tray guide 5 such that the gripper arm and tray guide 5 are laterally spaced from the lower tool half 6 when the lower tool half 6 rises to meet the upper tool half. This positioning of the tray guide 5 when the lower tool half rises to meet the upper tool half is clearly shown in FIG. 3B.

Figure 4:
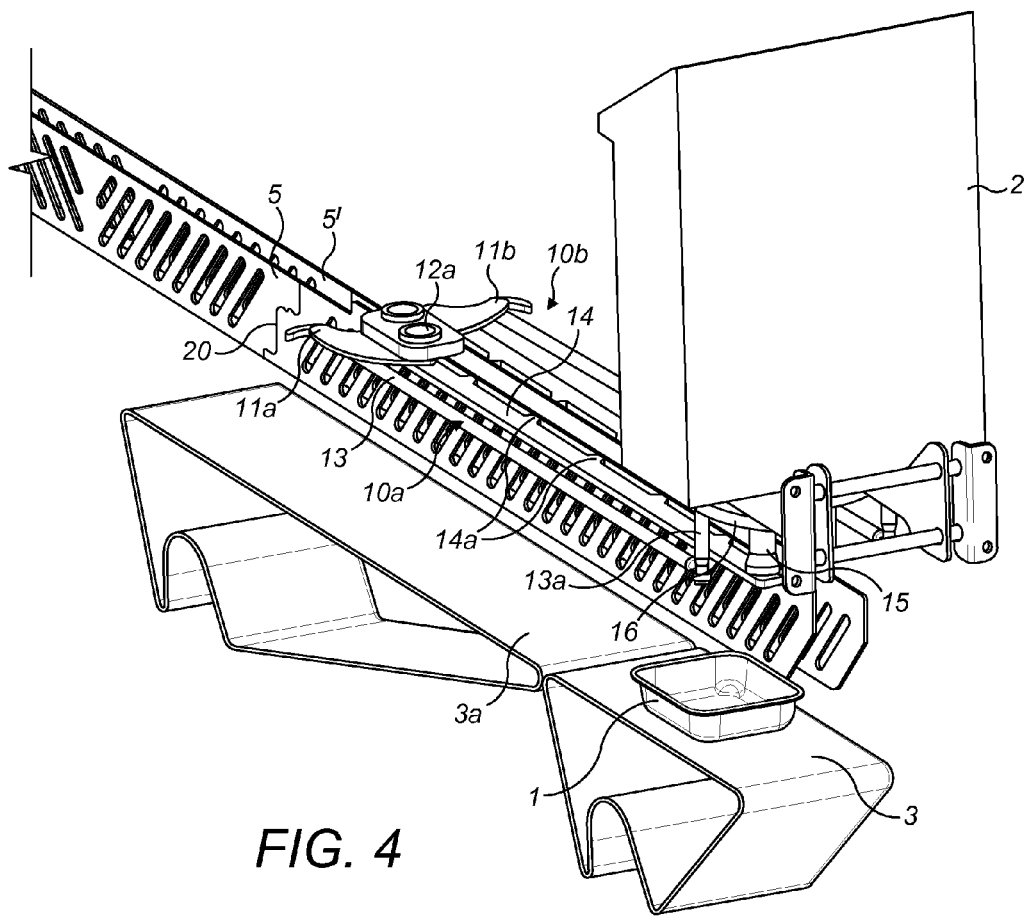
FIG. 4 is an enlarged perspective view showing the control apparatus of the tray guide system in more detail.

The tray guide 5 and its adjustment will now be described in more detail with reference to FIG. 4. FIG. 4 shows two tray guides 5, 5', preferably for use in a dual lane food packaging system as seen in FIG. 1. However, for ease of understanding the following description will refer to a single tray guide 5. The tray guide 5 is adjusted by an adjustment mechanism 10a driven by control apparatus 2. In this embodiment the adjustment mechanism is a parallelogram mechanism, although other mechanisms for adjusting the tray guide are envisaged, such as a four bar linkage or a rack and pinion based mechanism.

Mechanism 10a has two levers 11a and 16 mounted and spaced along the tray guide 5. Lever 11a is pivoted about mounting 12a. The two levers 11a and 16 are connected via connecting rods 13 and 13a, and support member 14 and pillar 15. Tray guide 5 is mounted from its upper edge via support member 14 which is linearly aligned with the tray guide. Support member 14 has a number of protrusions 14a for supporting the tray guide 5. Mounting the tray guide from its upper edge advantageously means that the support member is positioned away from the tray feed lanes, however other means of mounting the tray guide 5 are envisaged.

The mechanism 10a is driven by a motor (not shown) housed in the control apparatus 2. In this embodiment the motor is a servo motor. The motor drives the lever 16, which, via the connecting rod 13, rotates the lever 11a about pivot point 12a This adjusts the lateral position of the tray guide 5.

When a different sized tray is to be packaged, the lower tool half 6 and/or upper tool half will be changed to match the new tray size, and the tray guide 5 will be adjusted to guide the tray along the desired path.

Tray guide 5' is adjusted in the same manner by mechanism 10b. A second independent motor within the control apparatus 2 drives mechanism 10b. Two separate motors are used in control apparatus 2 so that no other mechanism is needed to pass through the sealing tool area, therefore maximising the sealing (working) area of the sealing tool 6.

Figure 2B:
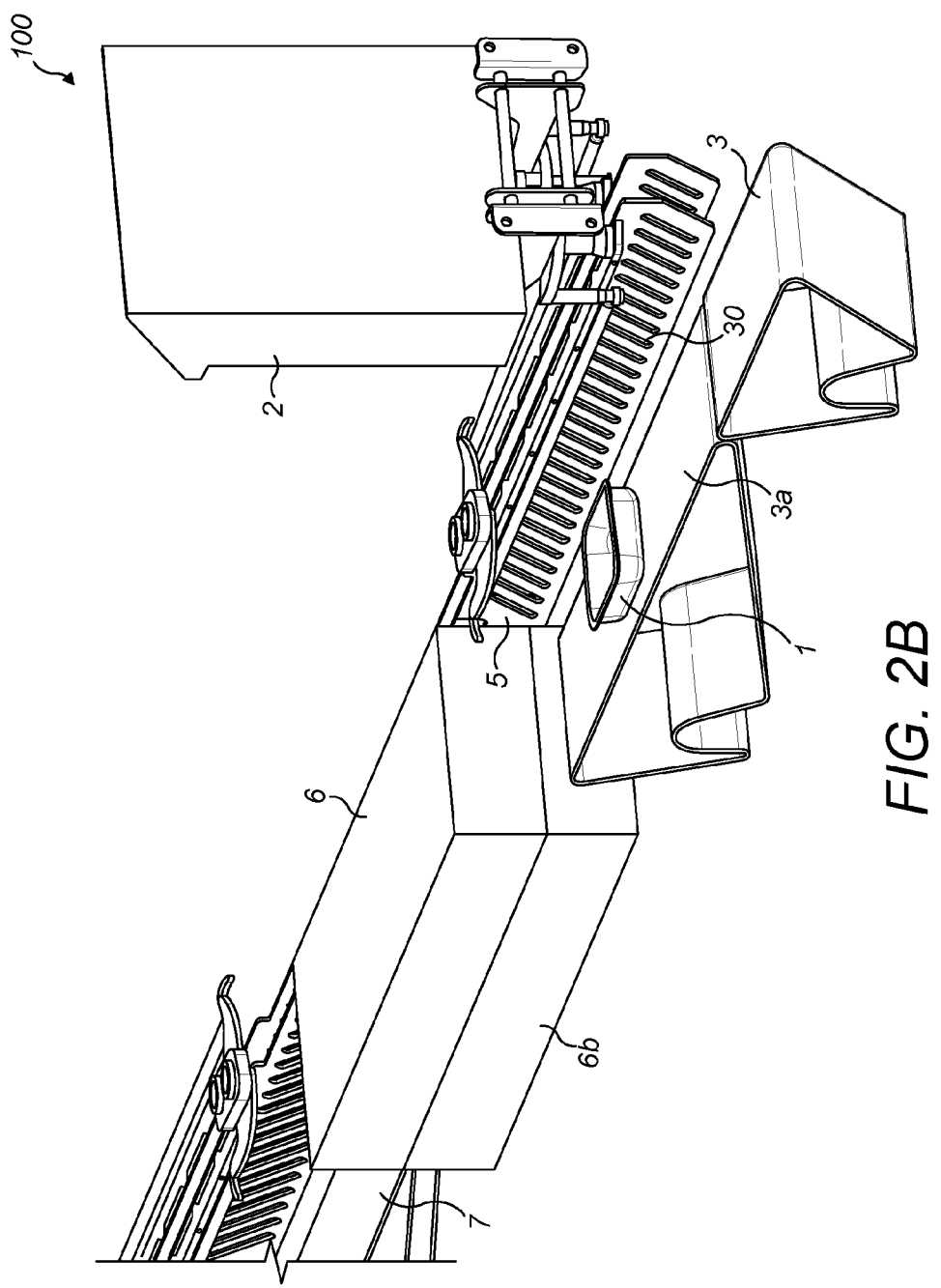
FIG. 2B is a perspective view similar to FIG. 2A but showing the lower tool half of the sealing tool in a raised position.

The positioning of lever 11a along the tray guide is so as not to foul the movement of the lower tool half 6, as illustrated in FIGS. 2 and 3. There is a complimentary drive system 2a and adjustment mechanisms 10c and 10d positioned at the output feed lane 7 end of the tray guide, as illustrated in FIG. 1. This reduces the strain placed on adjustment mechanism 10a in adjusting the position of the tray guide 5. However, it is envisaged that the tray guide can be operated with a single adjusting mechanism 10a.

As clearly seen in FIGS. 1, 2A, 2B and 4, the tray guides 5, 5' comprise holes 30. These advantageously reduce the weight of the tray guides, meaning that they can be moved faster, increasing the speed of a process cycle. Referring now to FIG. 2A, the hole cross sections have a maximum axis and a minimum axis, with the maximum axis being angled with respect to the plane of the conveyors 3, 3a. Two different hole angles along the guide 5 are represented, illustrated at 30a and 30b. The direction of motion of the trays in FIG. 2A is from right to left, and each hole 30a has an elongate cross section inclined towards the direction from which the trays are conveyed. In other words, the holes 30a are angled from "bottom left" to "top right" in the view of FIG. 2A. On the other hand, holes 30b, which are situated downstream of holes 30a, have an elongate cross section inclined in the direction in which the trays are being conveyed (i.e. they are angled "bottom right to top left).

It has been found that a hole of the form as seen at 30a (wherein each hole 30a has an elongate cross section inclined towards the direction from which the trays are conveyed) is desired, as this prevents undesirable snagging of the tray, lifting the tray off conveyor. If a tray engages (or "catches") one of the holes 30a of this embodiment, the holes are angled such that the tray is forced down onto the conveyor due to the relative motion between the tray and the guide. Therefore, in a preferred embodiment, all of the holes in the tray guide 5 are of the form seen at 30a.

Even so, other hole cross section geometries are envisaged, such as squares or circles. A tray guide may alternatively comprise holes with different geometries.

Figure 5A:
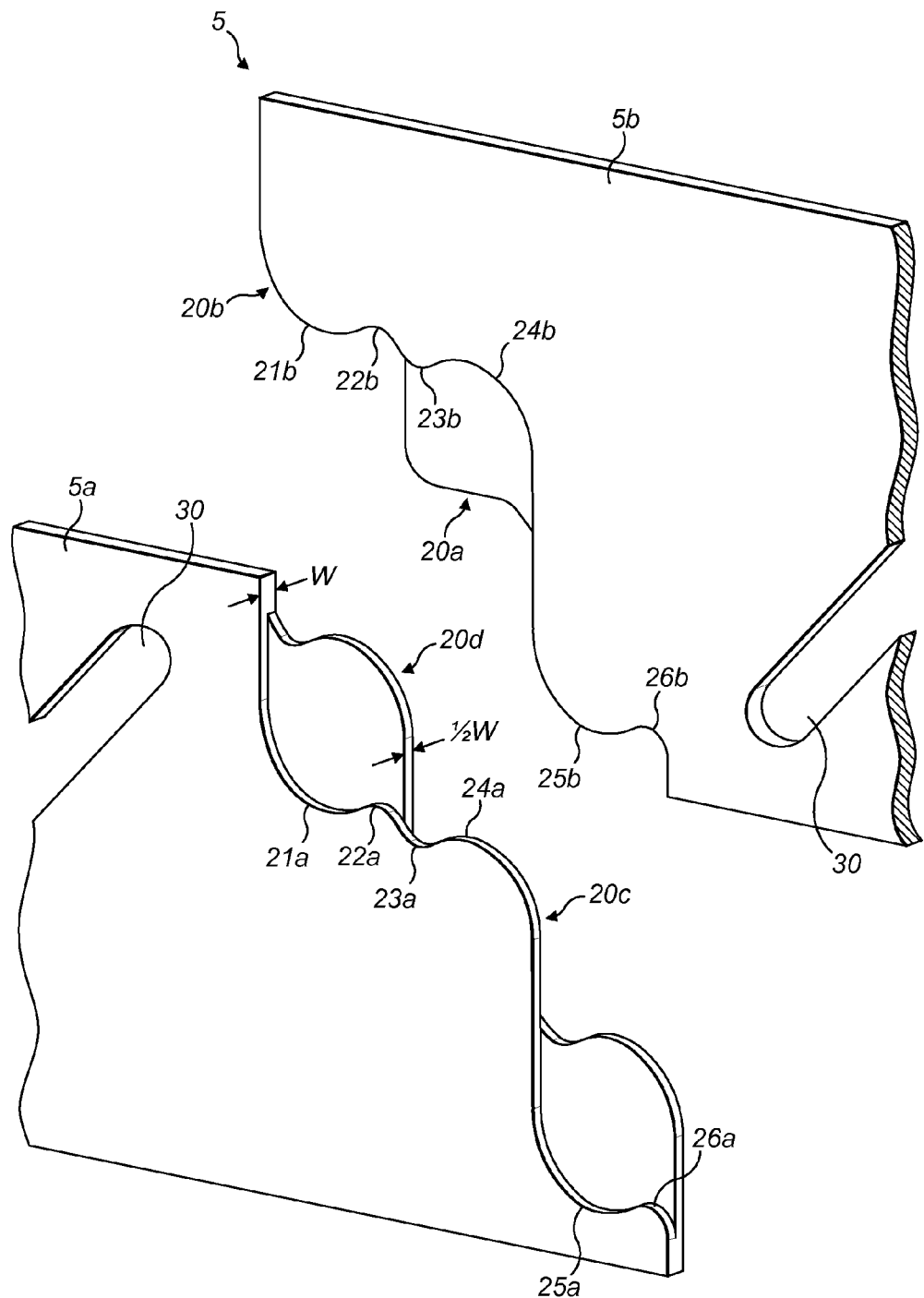
FIG. 5A is an enlarged view showing the join section of a tray guide in more detail.
Figure 5B:
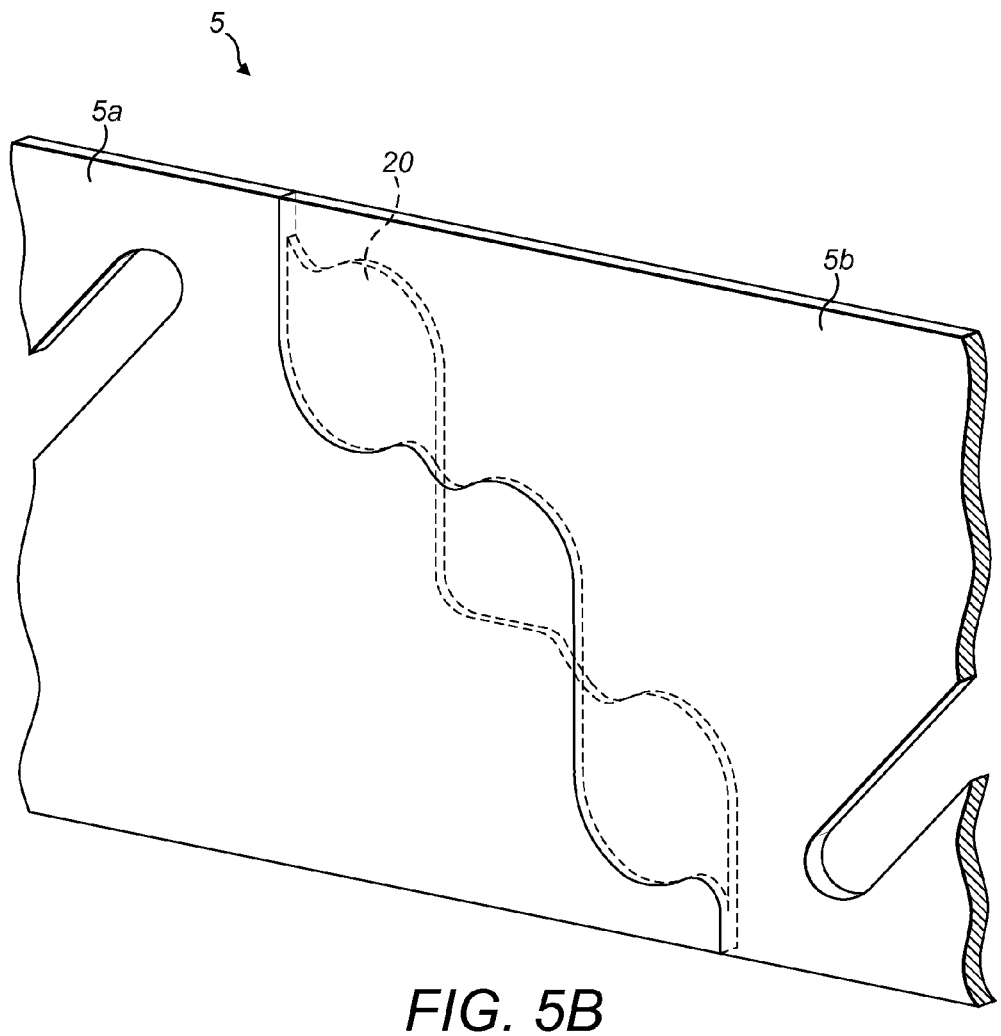
FIG. 5B is a further enlarged view showing the join section of a tray guide in more detail.

Turning now to FIGS. 5A and 5B, the joins 20 of the tray guides will be described in more detail. As set out above, each tray guides 5, 5' is comprised of three separate sections joined at joins 20. The use of separate sections allows for easier manufacture and transport of the tray guides, amongst other advantages. FIG. 5A shows two sections 5a and 5b, each having a width W.

In each section 5a, 5b, a contour (seen at 20a, 20b, 20c and 20d) of width W/2 if formed, comprising both protrusions and cut-outs. For clarity, only one contour per section will be discussed. In the view of FIG. 5A, the projections in contour 20b are shown at 21b, 23b and 25b, and the cut-outs are seen at 22b, 24b and 26b. The corresponding contour 20c of section 5a is complementary to contour 20b and has cut-outs seen at 21a, 23a and 25a, together with protrusions 22a, 24a and 26a.

When sections 5a and 5b are brought together, the complementary protrusions and cut-outs of contours 20b and 20c fit together, as do the complementary protrusions and cut-outs of contours 20a and 20d, therefore forming join 20. This is clearly seen in FIG. 5B. Advantageously, the use of this half-lap join between sections 5a and 5b provides a smooth surface at the join between sections 5a and 5b such that trays do not get snagged as they move past the join 20.

It is to be understood that the particular configurations of the contours seen in FIG. 5A are exemplary only, and other configurations are envisaged. For example, different geometries of the protrusions and cut-outs, or different widths of the contour sections, could be used. Other means of joining sections of a tray guide are also envisaged. In this particular embodiment, each of the adjustable tray guides 5, 5' comprises three separate sections joined together at joins 20 (clearly seen at FIG. 1) and provide a continuous single surface running along the first tray feed lane 3, the intermediate tray feed lane 3a, the lower tool half 6 and the output tray feed lane 7. However, it is envisaged that a tray guide may comprise more or less than three separate sections. Alternatively, a tray guide may be a single unitary member. A tray guide according to this embodiment moves as a single unit. This enables ease of removal of the lower tool half, either for replacement due to a different size container being packaged, or for maintenance.

In an alternative embodiment there is an adjustable tray guide running along at least the intermediate feed lane 3a, and the lower tool half includes a fixed guide, dedicated for a particular tray size. Here, the dedicated guide on the lower tool half remains in position when the lower tool half is raised to meet the upper tool half, and the container guide on the feed lane 3a is adjustable to align with the container guide on the particular lower tool half used at that time. For example, a particular lower tool half is used for packaging small containers with a dedicated guide aligning the trays in the desired position on the tool half. The guide on the feed lane is then adjusted accordingly to align with the guide on the lower tool half. When a lower tool half designed to accommodate larger containers is used, the dedicated guide on the lower tool half will be in a different position with respect to the guide on the feed lane and thus the feed lane guide will be adjusted accordingly.

In this embodiment, the adjustable tray guide may be adjusted using the same adjusting mechanism 10 described above, and may comprise two or more sections, as described above. The adjustable tray guide is adjusted so as to be longitudinally spaced from the lower tool half so that the upper tool half (which is generally larger than the lower tool half) may be lowered (for example, for replacement, removal or maintenance) without fouling the adjustable tray guide.

Of course, one lane of a dual lane container sealing apparatus may have one type of tray guide (for example the continuous tray guide running along the lower tool half and feed lane) and the other lane may have another, different type of tray guide (for example the fixed tray guide).

In the above-described embodiment, the lifting mechanisms 6b, 6'b (shown schematically in FIGS. 1, 2A and 2B) of the two lower tool halves 6, 6' are independent of each other, and there is a common upper sealing plate acting as the upper tool half. As an example, one lane 101 may be used to package and seal large trays, whilst the other lane 101' is used to package and seal smaller trays. In this instance, tray guide 5 is positioned such that the large trays are positioned correctly, and tray guide 5' is positioned to guide the small trays along the desired path. Thus the independently adjustable nature of the tray guides 5, 5' advantageously increases the ease by which different sized trays can be sealed and packaged simultaneously whilst maintaining a consistent path through the sealing apparatus, and also allowing the sealing forces to be in line with the independent lifting mechanisms, reducing stresses on said mechanisms.

Although the lower tool halves have independent lifting mechanisms, they may be operated in synchrony, being raised and lowered at the same time. In such a case, drive systems 2, 2a and adjusting mechanisms 10, are operable to adjust the position of the tray guides 5, 5' such that they move clear of the lower tool halves 6, 6' in synchrony. The tray guides 5, 5' then move back to their designated positions when the lower tool halves 6, 6' are in their lower position.

Alternatively, only one lane may be operable at one time; for example there may be a fault in one lane. In this instance, only one lower tool half is raised at one time and, as the positions of the tray guides 5, 5' are independently adjustable, only the corresponding tray guide is adjusted. The other tray guide remains stationary.

In an alternative embodiment, the lifting mechanisms are not independent, thus meaning that the sealing tools 6, 6' are operated in synchrony. However, the tray guides 5, 5' are still operated independently.

In a further alternative embodiment, the tray guides 5, 5' are not independently operable, and are driven by the same motor.

The above description refers to a dual lane food packaging system. However, the tray guide of the invention is able to be used in a single lane system or a multi-lane system comprising three of more lanes.

The invention claimed is:

1. A dual lane container sealing apparatus comprising a sealing tool arrangement having first and second lower tool halves and at least one upper tool half;
respective first and second laterally spaced feed lanes for transferring one or more containers to and away from the first and second lower tool halves of the sealing tool arrangement;
at least one lifting mechanism for moving the first and second lower tool halves towards the at least one upper tool half;
respective first and second elongate container guides extending along the first and second feed lanes and first and second lower tool halves to laterally locate containers as they are transported along the feed lanes and lower tool halves; and control apparatus adapted to adjust the lateral position of at least parts of said first and second container guides extending along said respective first and second feed lanes, wherein;

the lateral positions of said first and second elongate container guides are independently adjustable, and wherein the first and second lower tool halves are independently operable.

2. The dual lane container sealing apparatus of claim 1, wherein said elongate container guides extend along the feed lane lanes and lower tool halves, and wherein said control apparatus is adapted to adjust said container guides such that said container guides are laterally spaced from said respective lower tool halves when said lower tool halves are moved towards said at least one upper tool half.

3. The dual lane container sealing apparatus of claim 1, wherein the parts of the first and second container guides extending along the first and second feed lanes and the parts of the container guides extending along the lower tool halves are independently adjustable.

4. The dual lane container sealing apparatus of claim 3, wherein the parts of the first and second container guides extending along the respective feed is lanes are adjustable to be spaced from their respective lower tool halves.

5. The dual lane container sealing apparatus of claim 1, wherein at least one of said first and second elongate container guides comprises at least two separate sections.

6. The dual lane container sealing apparatus of claim 5, wherein the at least two separate sections are joined using a half-lap joint.

7. The dual lane container sealing apparatus of claim 1, wherein at least one of the elongate container guides comprises at least one hole.

8. The dual lane container sealing apparatus of claim 7, wherein the at least one hole is arranged such that when a part of a container is engaged within the at least one hole, a downward force is applied to the container due to the relative motion between the container and the container guide.

9. The dual lane container sealing apparatus of claim 1, wherein the control apparatus comprises a parallelogram mechanism operable to adjust the lateral position of said first and second container guides.

10. The dual lane container sealing apparatus of claim 1, wherein the means for transferring containers on to the lower tool halves of the sealing tool arrangement is a mechanical gripper, wherein said mechanical gripper is operable to handle containers of different dimensions.

11. The dual lane container sealing apparatus of claim 1, wherein the sealing tool arrangement is a heat sealing tool and the at least one upper tool half is a heated upper plate.

12. The dual lane container sealing apparatus according to claim 1, wherein the at least one upper tool half is an upper heated plate that is common to said first and second lower tool halves.

13. The dual lane container sealing apparatus according to claim 1, wherein the sealing tool arrangement comprises first and second upper tool halves corresponding to the first and second lower tool halves.

* * * * *